United States Patent [19]

Mudrovich

[11] Patent Number: 4,970,630
[45] Date of Patent: Nov. 13, 1990

[54] REMOVABLY-MOUNTABLE INTEGRAL LIGHTING SYSTEM

[75] Inventor: George Mudrovich, Richardson, Tex.
[73] Assignee: Gruhn USA, Inc., Richardson, Tex.
[21] Appl. No.: 374,456
[22] Filed: Jun. 30, 1989
[51] Int. Cl.$^5$ .............................................. B62J 6/00
[52] U.S. Cl. ..................................... 362/72; 362/184; 362/191; 362/192
[58] Field of Search ......................... 362/61, 72, 80, 83, 362/183, 184, 190, 191, 197, 198, 199, 202, 205, 368, 370

[56] References Cited

U.S. PATENT DOCUMENTS

| | | | |
|---|---|---|---|
| 2,742,607 | 4/1956 | Ryan | 362/184 |
| 2,788,763 | 4/1957 | Ries | 362/72 |
| 2,811,633 | 10/1957 | Bjork | 362/72 |
| 2,861,174 | 11/1958 | Talbot et al. | 362/199 |
| 4,204,191 | 5/1980 | Daniels | 362/72 |
| 4,325,107 | 4/1982 | MacLeod | 362/183 |

FOREIGN PATENT DOCUMENTS 644480 5/1937 Fed. Rep. of Germany ........ 362/72
0264435 1/1927 United Kingdom ................. 362/72

Primary Examiner—Ira S. Lazarus
Assistant Examiner—Alan Cariaso
Attorney, Agent, or Firm—Johnson & Gibbs

[57] ABSTRACT

The present invention relates to a removably-mountable integral lighting system having an elongate battery housing which includes a first lighting assembly mounted to its forward end, and a second lighting assembly mounted to its rear end. Each end of the housing includes means for engaging a structural member. The length of the housing can be axially adjusted to allow removable mounting of the system between the structural members of a vehicle and to accommodate mounting spaces of different sizes. The elongate housing includes at least two sections which are axially movable with respect to one another and are spring biased to allow compression of the spring when one end of the housing is moved toward the other for producing a force of securement when the housing is positioned in a space between two structural members which space is smaller than the overall length of the housing in an uncompressed state.

50 Claims, 2 Drawing Sheets

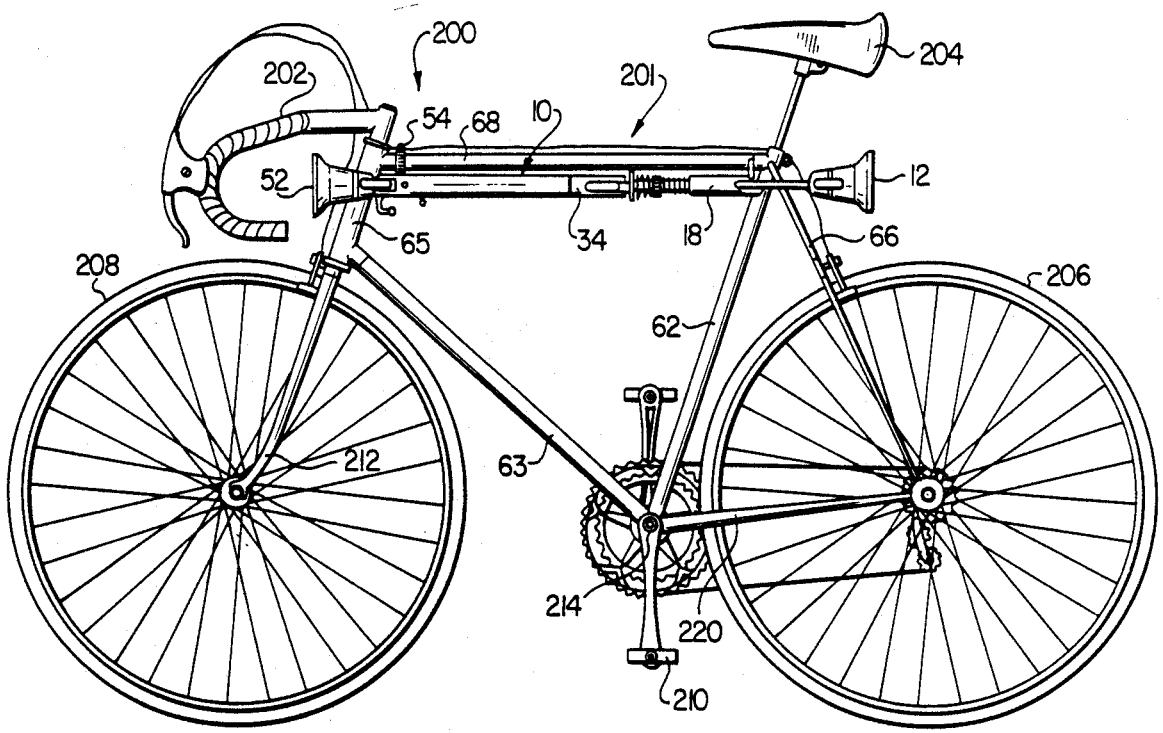
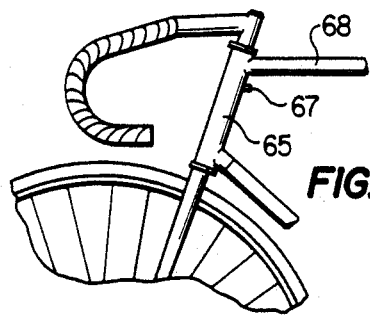
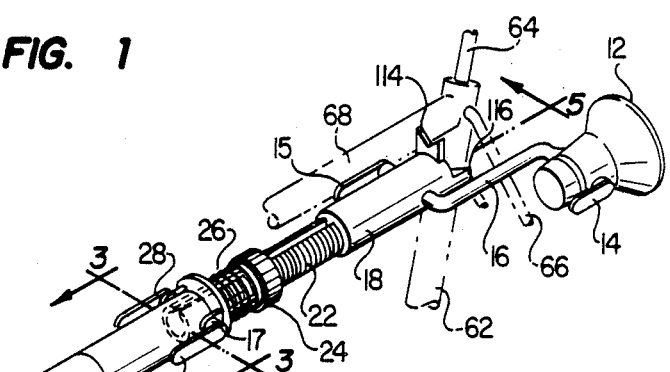
FIG. 1
FIG. 1A
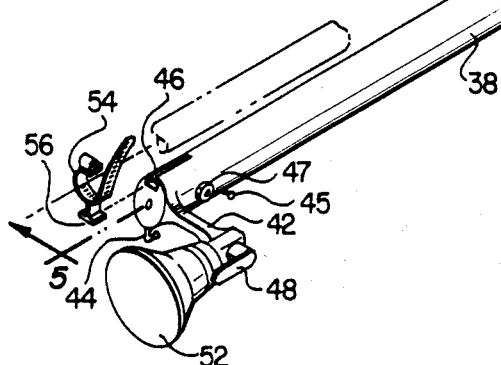
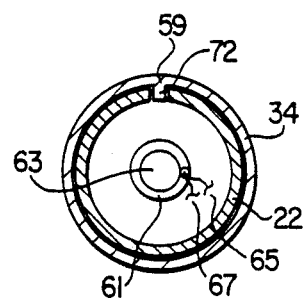
FIG. 2
FIG. 3

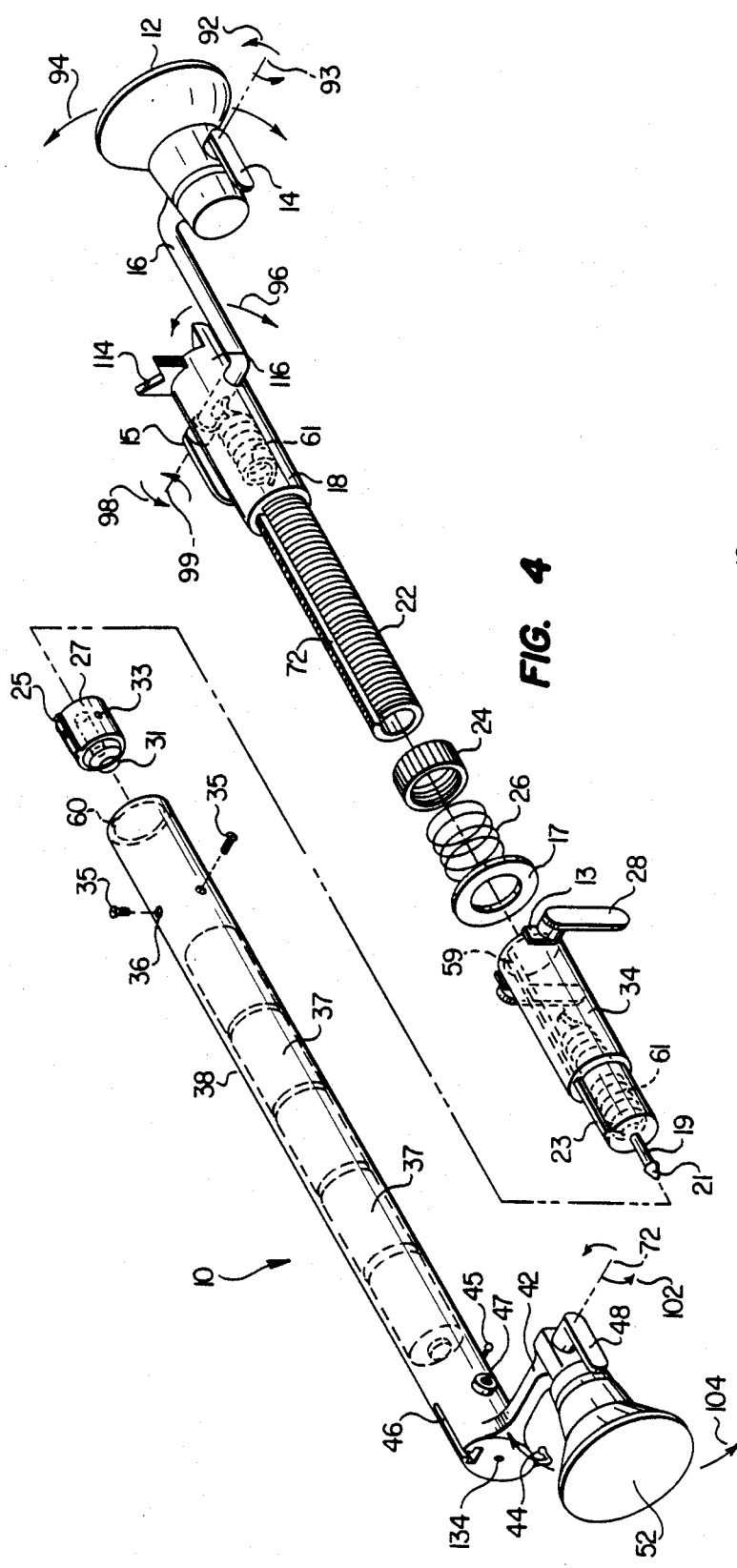
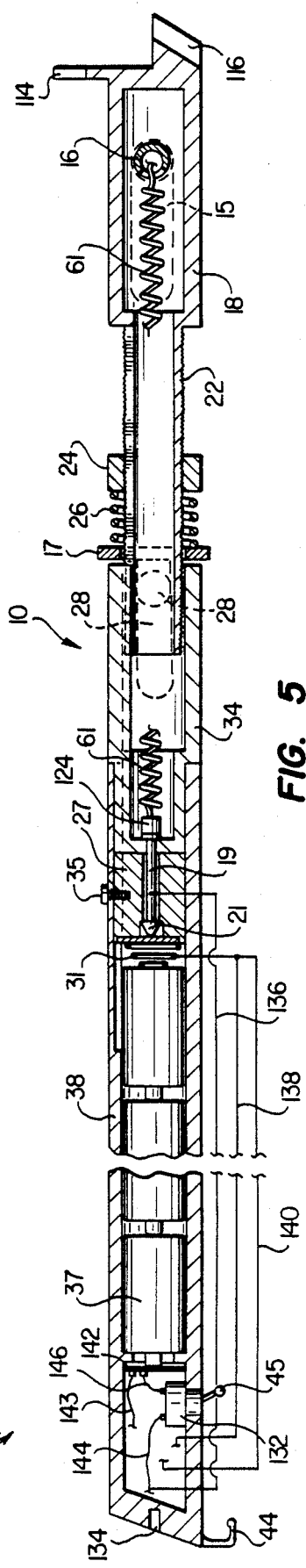

REMOVABLY-MOUNTABLE INTEGRAL LIGHTING SYSTEM

FIELD OF THE INVENTION

The invention relates to a removably-mountable integral lighting system and, more particularly, to a removable bicycle light assembly.

BACKGROUND OF THE INVENTION

Bicycle lighting systems which are operable from batteries or miniature generators are well known in the art. Most bicycle lighting systems consist of a headlamp for providing adequate light to illuminate the path that lies ahead of the bicycle. Other known bicycle lighting systems may also include a high-visibility tail lamp to indicate the presence of the bicycle to vehicles that are following the bicycle. Moreover, bicycle lighting systems are required safety devices for people bicycling at dusk or in darkness. Such lighting devices must be lightweight so as not to add too much weight to the bicycle and are also preferably aesthetically pleasing.

One limitation of prior art bicycle lighting systems is that most are multi-part assemblies with a separate headlight, a tail light and a power supply, all interconnected by open wiring. Such systems are unnecessary during daylight hours and add needless weight to the bicycle. In addition, they are time consuming to install and/or remove and subject to theft when the bicycle is left unattended.

For example, U.K. Patent No. 13,344 to Harton describes a bicycle lighting system including separate electric head and tail lamps arranged so that they may be independently switched on and off. The headlamp is secured to the bicycle head tube near the handle bar; while the tail lamp is attached to the rear wheel support frame. A batteries box and control switches assembly are secured to the frame of the cycle and connected to the lamps by wiring.

In U.S. Pat. No. 1,439,430 to Lyhne, it is taught battery covers for supporting and protecting batteries to be used for lighting on bicycle. The battery container is to be clamped in a bicycle frame and to be connected to the lamps.

U.S. Pat. No. 3,894,281 to Bloomfield teaches a vehicle lighting system that utilizes both generating means and battery means to provide constant lighting whether the bicycle is moving or not. The headlamp and the tail lamp are separately mounted on different parts of the bicycle.

U.S. Pat. No. 4,019,171 to Martelet teaches a velocity-responsive lighting system including light means that are periodically illuminated in sequence for a period determined by the velocity of the vehicle. The switch and circuit assembly is secured to the horizontal top tube of the bicycle, while the rear light assembly is secured to the rear fender by a U-shaped bracket. The magnetically responsive switch assembly is attached to seat stay support member.

Other single lamp bicycle layout systems have been constructed to be removable. For example, U.S. Pat. No. 1,848,235 to Wiley discloses a lamp mounting which is detachably securable to a mud guard of a bicycle or a motorcycle. The bracket readily conforms to the contour of mud-guards of various shapes and dimensions. The device provides a releasable clamping member by which the mounting may be firmly secured against displacement on a mud-guard without requiring the drilling of holes on the mudguard.

U.S. Pat. No. 4,204,191 to Daniels discloses a bicycle lighting system which provides a turn indication feature. The housing for the battery power and the circuit is removably mounted upon an upstanding strut of the bicycle frame. The headlamp, the tail lamp, and the indicator lamp are each separately secured to other parts of the bicycle. Similarly, Spingler in U.S. Pat. No. 4,325,108 teaches a rechargeable battery unit that is removably attached to a bicycle. The device includes a transfer switch to permit selective energizing of a headlamp and/or tail lamp from a battery or from a generator.

U.S. Pat. No. 4,555,656 to Ryan discloses a generator and rechargeable battery system for a bicycle. The battery system is secured to the seat tube of the bicycle. The headlamp is separately mounted to the handle bar, while the tail lamp is attached to the rear "mud-guard" of the bicycle.

None of the illustrated prior art bicycle lighting systems discussed includes an integral, one-piece, lighting assembly which is completely removably mounted on a bicycle. In each of the prior systems, the power supply, the headlamp, and the tail lamp are separately mounted on different parts of the bicycle. The present invention overcomes many of the disadvantages of known bicycle lighting systems by adapting an integral lighting system to secure as a totally removably-mountable lighting assembly for a bicycle. Such a lighting system can be mounted to the bicycle when it is needed and removed and safely stored when it is not. Thus, no extra weight is being "carried along" on the bicycle when no lighting system is needed. Further, the integral lighting system of the present invention can be completely removed from the bicycle to prevent theft of the system when the bicycle is left locked but unattended. The present integral lighting system is portable and can be secured in a backpack or briefcase.

Moreover, the specific construction of the present assembly provides a beam of light from the headlamp that is steady and does not jump from side-to-side as the rider of the bicycle moves the handle bar to turn or maneuver the bicycle. This is due to the fact that the headlamp is secured to the bicycle's frame, which will only move slightly from side-to-side while the handlebars are moved through large angles. Handlebar-mounted headlamps necessarily move through the same angle that the handlebar does.

SUMMARY OF THE INVENTION

The present invention relates to a removably-mountable integral lighting system having an elongate housing assembly including means for receiving a battery and adapted for removable securement to a structural member; a first lighting assembly mounted to a forward end of the housing and electrically connected to the battery for being illuminated; and a second lighting assembly mounted to the rear end of the housing and electrically connected to the battery for being illuminated. The length of the mounting assembly can be adjusted to accommodate attachment to different sizes of bicycles.

Accordingly, an object of the present invention is to provide an integral bicycle lighting system, or device, that can be totally and easily mounted on, and removed from, a bicycle.

Another object of the present invention is to provide an integral bicycle lighting system, or device, that can be easily mounted, whether or not using the tire pump peg of the bicycle, on any size of bicycle by simply extending or shortening the lighting device itself.

A further object of the present invention is to provide an integral bicycle lighting system, or device, having both the headlamp and the tail lamp remain in the optimum positions relative to the bicycle frame.

Still a further object of the present invention is to provide an integral bicycle lighting system, or device, with the headlamp projecting the light unencumbered, while not interfering with the rotation of the handle bars nor interfering with the use of the front brakes.

Yet another object of the present invention is to provide an integral bicycle lighting system, or device, with a tail lamp mount that stays close to the seat tube or seat stay so as not to interfere with the rider's legs as he or she pedals the bicycle.

Still another object of the present invention is to provide an integral bicycle lighting system, or device, that is battery powered and will operate whether the vehicle, such as a bicycle, is moving or not.

A further object of the present invention is to provide an integral bicycle lighting system, or device, that is lightweight, and can be actuated by a manual switch, and whose power supply is rechargeable by household current via a transformer.

A still further object of the present invention is to provide an integral bicycle lighting system that can be taken apart, folded and stored in a backpack or briefcase.

Yet another object of the present invention is to provide an integral bicycle lighting system, or device, that can be mass produced at reasonable costs.

Yet a further object of the present invention is to provide an integral bicycle lighting system that gives out a beam of light from the headlamp that is steady and does not jump from side-to-side as the rider of the bicycle jerks the handle bar from side-to-side.

Still another object of the present invention is to provide an integral bicycle lighting system in which the angles of both the headlamp and the tail lamp can be readily adjusted.

Another object of the present invention is to provide an integral bicycle lighting system that has no exposed wires.

BRIEF DESCRIPTION OF THE DRAWINGS

For a more complete understanding of the present invention and for further objects and advantages thereof, reference may now be added to the following description taken in conjunction with the accompanying drawings in which:

FIG. 1 is a side plan view of a bicycle having a removably-mountable integral bicycle lighting system constructed with the principles of the present invention, mounted along and under its horizontal top tube;

FIG. 1A is a partial side view of the head tube of a bicycle illustrating a feature related to mounting of the present lighting system;

FIG. 2 is a perspective view of one embodiment of a removably-mountable integral bicycle lighting system constructed in accordance with the principles of the present invention;

FIG. 3 is a cross-sectional view taken along line 3—3 of FIG. 2;

FIG. 4 is an exploded perspective view of the removably-mountable integral bicycle lighting system of FIG. 2 illustrating some of the internal components of a removably-mountable integral bicycle lighting system;

FIG. 5 is a cross-sectional view taken along line 5—5 of FIG. 2.

DETAILED DESCRIPTION OF THE PREFERRED EMBODIMENT

The present bicycle lighting system is adapted for removable inclusion on most types of modern bicycles or similar riding conveyers. Referring first to FIG. 1, there is shown a conventional modern bicycle 200 which includes a frame 201, a pair of handle bars 202, a seat 204, a pair of wheels 206 and 208 and pedals 210 adapted for driving the rear wheel through a chain and sprocket mechanism. The frame 201 consists of a top tube 68, to which a head tube 65 and seat tube 62 are integrally attached. A down tube 63 is attached at the lower rear portion of the head tube 65. At the juncture of the down tube 63 and seat tube 62 is the bottom bracket 214 which mounts the pedals 210 and drive sprocket mechanism. The front wheel 208 is mounted between a front fork 212, which is attached to the handle bars 202 for steering. Two seat stays 66 extend downward and backward from the seat tube 62 on either side of the rear wheel 206. Two chain stays 220 extend backward from the bottom bracket 214 on either side of the rear wheel 206. The rear wheel's axle is mounted at the junction of the chain stays 220 and seat stays 66 on either side of the rear wheel 206. As seen in FIG. 1A, certain bicycles include a tire pump peg 67 formed on the rear of the head tube 65 for use in mounting a tire pump to the frame of the bicycle. As can be seen in FIGS. 1 and 1A, many modern bicycles have no mudguards covering the wheels of the bicycle thus limiting the mounting location for bicycle lighting systems for use on the bicycle.

Referring to FIG. 1, there is shown a side plan view of a bicycle having mounted along its horizontal top tube 68 a removably-mountable integral bicycle lighting system 10 constructed in accordance with the principles of the present invention. The bicycle lighting system 10 is situated between the head tube 65 and the seat tube 62 and, in this embodiment, is mounted on the top tube 68 using an auxiliary clamp 54. For a bicycle that is equipped with a tire pump peg, as illustrated in FIG. 1A, the auxiliary clamp 54 is not needed to mount the lighting system 10 onto the bicycle, as will be further discussed below.

As can be seen from FIG. 1, the lighting system of the present invention 10 includes an elongate tubular assembly formed of a battery chamber 38 which is closed at the rear end by an internal contact plug 27 (not shown). The forward end of the tubular assembly mounts a head lamp 52, which is attached by a holder 42 which allows adjustment of the headlamp angle and, thus, the angle of the light shining in front of the bicycle 200. A battery pack end cap 34 is inserted into the battery pack 38. An electrical contact post 21 or 19 (not shown) on the forward end of the battery pack end cap 34 is inserted into the rearward end of the internal contact plug 27 (not shown). Cap 34 is affixed to a cylindrical rear mount 18 by means of a spring biased adjustable spring clamp means (not shown). Spring clamp means recesses to secure the tubular assembly just below the top tube 68 of the bicycle 200, wedged between the head tube 65 and the seat tube 62 by the force of the spring bias. Affixed to rear mount 18 is a conduit 16 which mounts a tail lamp 12. The angle of tail lamp 12 may be adjusted by rotating it on the rear end of conduit 16.

Referring now to FIG. 2, there is shown a perspective view of one embodiment of a removably-mountable integral bicycle lighting system 10 constructed in accordance with the principles of the present invention along with fragmentary portions of the horizontal top tube 68 of a bicycle. A first, or forward, lighting assembly comprises a headlamp holder or conduit 42, a headlamp angle quick release lever 48, and a headlamp 52. In this particular embodiment, an auxiliary tire pump peg 44 is fitted along the underside of the battery pack 38. Furthermore, a recess 134 adapted to engage a bicycle frame tire pump peg 67 (not shown) is provided on the frontal surface of the battery pack 38. A female portion 46 of a T-slot mounting is also formed along the upper side of the battery pack 38. As shown in FIGS. 1 and 2, the front end of the lighting system 10 can also be held to the bicycle to the top tube 68 by a T-slot clamp 54 which mounts the male portion 56 of the T-slot mounting sliding engagement with the female portion 46 of the T-slot mounting. Clamp 54, thus, serves to hold the front end of the lighting system 10 to the top tube 68. The front of the lighting system 10 butts up against the back of the head tube 65 (as shown in FIG. 1) so that there is no transverse pressure of the lighting system or device 10 against the T-slot clamp 54, since the male T-slot clamp 54 is not all the way into the female portion 46 of the T-slot and does not contact the rearmost portion of the female T-slot. Near the front and on the underside of the battery chamber or pack 38 is an on-and-off toggle switch 45 which is connected to enable manually actuating both the headlamp 52 and the tail lamp 12. Also provided near the rear of the battery chamber 38 are screw holes 36 for receiving threaded screws to fasten the battery chamber 38 to the internal contact plug 27 (not shown) as discussed below inside the battery chamber 38. Beneath and near the front or forward portion of the battery chamber 38 is a battery recharger receptacle 47. The batteries mounted within the battery chamber 38 can be recharged by means of household current (via a transformer) connected to the system through this receptacle 47.

Still referring to FIG. 2, the middle assembly of the lighting system 10 includes a battery housing for receiving a plurality of longitudinally abutting and series connected direct-current batteries. Although conventional cylindrical, D-size dry cell batteries are shown, other sizes, shapes and types of batteries could be used. At the rear of the middle assembly are a washer 17 and two cam levers 28. In use, one terminal of each cam lever 28 abuttedly engages the surface of the washer 17. Spring 26 allows for misadjustment of the length of the elongate lighting system 10. Directly rearward from the battery pack 38 is the battery pack end cap 34.

Rearward from the washer 17 is the second, or rear, lighting assembly comprising a compression-type spring 26 followed by an internally threaded washer 24. The internally threaded washer 24 fits over a threaded shaft 22 comprising a length adjuster which can be screwed in and out along the horizontal axis of the lighting system 10. Firmly attached on the rearward portion of the threaded shaft 22 is the rear mount 18. The rear mount 18, the quick release lever 15, the tail lamp holder 16, and the tail lamp 12, together with the quick release lever 14 for adjusting tail lamp angle make up the remainder of the rear lighting assembly. FIG. 2 shows that the rear mount 18 is positioned abuttedly against the front surface of the seat tube 62 via a lower V-block 116. The upper V-block 114, in turn, abuttedly engages the rear underside of top tube 68.

Referring now to FIG. 3, there is shown a cross-sectional view taken along line 3—3 of FIG. 2. The cross-section of coiled electrical cord is shown as 61. A negative electrical wire 67 and a positive electric wire 65 emerge from the coiled cord 61 for making the necessary electrical connection. The battery pack end cap 34 surrounds and encompasses the threaded shaft length adjuster 22. Internal spline 59 in the battery pack end cap 34 slides into a groove 72 formed along the length of the threaded shaft length adjuster 22 and, thus, prevents the shaft 22 from rotating out of position with respect to the battery pack end cap 34. This, in effect, assures that the entire lighting system 10 does not rotate out of its proper position with respect to the bicycle frame 201.

Referring now to FIG. 4, it can be seen that the length of the lighting system 10 can be adjusted by rotating the internally threaded washer 24 along the length of the threaded shaft length adjuster 22. The internally threaded washer 24 can be moved along the helical grooves extending the entire length of the threaded shaft length adjuster 22 by simply rotating it either clockwise or counter-clockwise. The closer the washer 24 comes to the rearmount 18, the shorter the overall length of the lighting system 10 becomes. The forward portion of the threaded shaft length adjuster 22 slides into the cavity of the battery pack end cap 34 as the length of the lighting system 10 is shortened.

Still referring to FIG. 4, to mount the lighting system 10 along and beneath the top tube of the bicycle, it is necessary to adjust the internally threaded washer 24 by rotating it so that the entire system 10 will be about ⅜ shorter than the space between the head tube 65 and the seat tube 62 of the bicycle to which the system is to be mounted. During length adjustment, the two cam levers 28 should be in their downward position, that is, the long dimension of the levers should extend perpendicular to the axis of the battery housing so that the compression-type spring 26 is also in its relaxed (uncompressed) state. The rearward surface of washer 17 abuts the forward end of spring 26. The forward portion of the threaded shaft length adjuster 22 slides into the battery pack end cap 34. For the purpose of length adjustment, the threaded shaft length adjuster 22 should slide into the battery pack end cap 34 to the extent that the vertical surface of the internally threaded washer 24 abuts the compression-type spring 26 which, in turn, abuts one radially extending surface of washer 17. The opposite surface of washer 17 abuts the battery pack end cap 34.

When the length of the lighting system 10 has been properly adjusted, the lighting system 10 is placed in its mounting position just under, and substantially parallel to, the top tube of the bicycle. Then, both cam levers 28 are rotated 90° in a forward and upward direction so that the long dimension of levers 28 is parallel to the axis of the battery housing. Rotation of the cam levers 28 in this direction presses the flat surface 13 of the levers against the forward surface of washer 17. The rearward surface of washer 17 also compresses helical spring 26. Spring 26, in turn, presses against the forward vertical surface of the internally threaded washer 24. The washer 17 has an internal circular hole large enough to slide unhindered along the entire length of the threaded shaft length adjuster 22. Spring 26 must be made from a very stiff material, so that its effective length does not vary much as it is compressed. When the cam levers 28 are rotated 90° in a forward and upward direction (i.e., in a "locked" position in which the long dimension levers are parallel to the battery housing), the entire rearward assembly is moved toward the rear of the bicycle, thus extending the length of the light system 10.

A flat surface 13 on cam levers 28 protrudes about ⅞". Rotating levers 28 in a forward and upward direction so that the long dimension of the levers is parallel to the axis of the battery holder should, therefore, extend the length of the entire lighting system 10 by about ⅞". However, as mentioned above, the length of the entire system has been previously adjusted to be only ⅜" shorter than the space between the head tube 65 and the seat tube 62 of the bicycle to which the system is to be mounted. Therefore, when the cam levers 28 are rotated in a forward and upward direction, the system's length increases by about ⅞", compressing the spring 26 by about ⅜" in length at the same time. That is, when spring 26 is compressed, it is about ⅜" shorter than when it is in its relaxed, uncompressed condition. In this way, spring 26 presses the forward and rearward halves of the system away from one another. This force holds the entire lighting system 10 in place in between the head tube 65 and the seat tube 62 of the bicycle to which the system is mounted. The force also pushes washer 17 against flat surface 13 of levers 28 to insure that the levers do not rotate back to their downward (unlocked) position. Spring 26 also has another function, in that it allows "misadjustment" of overall length when the internally threaded washer 24 is initially positioned. For example, if the internally threaded washer 24 has been posi-tioned so that the length of the assembly of the lighting system 10 is about ¼" or ⅛" shorter than the space between the head tube and the seat tube of the bicycle, instead of the preferred ⅜" distance as mentioned above, spring 26 will allow for this misadjustment by compressing its length more or less as required when the cam levers 28 are rotated 90° in a forward and upward position to lock the system in place.

The internal parts of the battery pack 38, the internal contact plug 27 in the battery pack, the interior of the battery pack end cap 34, and the threaded shaft length adjuster 22 are each provided with either a longitudinally extending groove or a mating spline to engage one another to prevent any rotation of the internal components of the lighting system 10. Thus, when the lighting system is assembled, all these components are positioned in their correct rotational orientation with respect to each other. That is, the headlamp 52 and the tail lamp 12 protrude off to the left side of the bicycle and in a direction parallel to the ground. In this configuration, spline 25 of the internal contact plug 27 is received into groove 60; spline 23 of the battery pack mid cap 29 is also received into groove 60 of the battery pack 38; and the internal spline 59 of the battery pack end cap 34 is received into groove 72 of the threaded shaft length adjuster 22.

The coiled electrical cord 61 is connected to both the positive electrical contact post 19 and the negative contact 21 in order to complete the power circuit to the tail lamp 12. The coils in the cord 61 accomodate changes in overall length of the lighting system 10. FIG. 4 illustrates the use of five batteries 37 in series inside the battery housing or battery pack 38. Normally, five D-cell batteries are used, each with 1.25 volts, although other configurations are possible. The battery pack 38 is provided with three screw holes 36 which receive threaded screws 35 to secure the internal contact plug 27 in place within the battery pack by means of holes 33 formed in the internal contact plug 27 in alignment with holes 36 of the battery pack 38. The internal contact plug 27 includes a contact spring 31, for electrical engagement with the negative pole of the batteries.

Still referring to FIG. 4, the front end of the outer housing of the lighting system 10 includes a recessed hole 134 for engaging the tire pump peg on the rear of the head tube of a bicycle. Also at the forward end of the housing is a headlamp conduit 42 which is preferably hollow and includes an externally threaded shaft that passes through a transversely extending aperture in the rear of the headlamp assembly 52. A quick-release lever 48 for headlamp 52 is internally threaded and is received onto the threaded shaft at the end of the conduit 42. When the lever 48 is rotated in a clockwise direction, the lever presses against the bore of the headlamp assembly to lock it into position against the end of the conduit 42. When the lever 48 is rotated in a counter-clockwise direction, as shown by arrow 102, it no longer presses the headlamp assembly against the end of conduit 42, so the headlamp 52 can rotate freely about the threaded shaft upon which it is mounted in either an upward or a downward direction as shown by arrows 104 to adjust the angle of the headlight beam. When the desired angular position of the headlamp assembly has been attained, lever 48 is turned clockwise to again lock the headlamp 52 against further movement.

For purposes of storage, the elongate housing can be separated into two pieces at the junction of battery pack 38 and battery pack end cap 34. When assembled, the electrical contact 21 is retained inside the internal electrical contact plug 27 by a clip (not shown). For separation, simply pull the battery pack end cap 34 rearward. Further, the tail lamp holder 16 can be folded back 180° to reduce the length of the stored piece.

The height of the tail lamp assembly is adjustable by a mechanism that is similar to the one described above for adjusting the angle of headlamp 52. This allows the height of the tail lamp to be adjusted in order to clear any packs or racks that may be attached to the bicycle or the seat. When the quick-release lever 15 is rotated in the direction as shown by arrows 98, the conduit 16 can be rotated in the direction as shown by arrows 96. Similarly, the quick-release lever 14 is rotated clockwise to lock the tail lamp 12 into position. When the quick-release lever 14 is rotated in a counter-clockwise direction, as shown by arrows 92, the tail lamp 12 can be rotated in a direction as shown by arrows 94.

Referring now to FIG. 5, there is shown a longitudinal cross-sectional view taken along line 5—5 of FIG. 2. Here it is shown that the lighting system 10 is controlled by toggle 45 of the on/off switch 132. The auxiliary tire pump peg 44 is shown to be situated on the underside of the battery housing near the front portion of the lighting system 10. The positive contact post 19, together with its negative electrical contact 21, is connected to the coiled cord 61 through a connecter 124. At the rear of lighting system 10 the tail lamp holder 16 receives the coiled cord 61 therein. Wiring continues through conduit 16 to the tail lamp (not shown). When the system is mounted on a bicycle frame, the upper V-block 114 and the lower rearward V-block 116 engage the lower side of the top tube 68 and forward side of the seat tube 62 of the bicycle, respectively, as illustrated in FIG. 2. The two V-blocks, 114 and 116, prevent the lighting system 10 from rotating and also center the system under the top tube 68 and against the seat tube 62.

Referring to FIG. 5, there is shown a schematic circuit of the lighting system 10. None of the wires are exposed to the outside but, rather, are contained within the housing unit itself for protection. Schematic line 140 represents the connection of a lead from the negative pole of the rearmost battery 37 to the recharger receptacle 47 (not shown). Contact plate 142 includes two contacts, the first of which is connected to wire 143 that extends directly to the battery recharger receptacle 47 (not shown) so that the lighting system 10 can be recharged regardless of the position of the on/off switch 132; the second contact of plate 142 is connected to wire 146 that is, in turn, connected to the on/off switch 132 to interrupt current to both the headlamp 52 and the tail lamp 12 when the switch is turned to its "off" position. The headlamp 52 is connected to a positive lead 144, and to the negative pole of the last battery through schematic line 138. The tail lamp 12 is connected to a positive lead represented by schematic line 136 and joins lead 144. The tail lamp 12 is also connected to the negative pole of the rearmost battery through coiled cord 61, connector 124, electrical contact 21, and spring 31.

The lighting system 10 is preferably constructed from lightweight but sturdy plastic or metal alloy. Both the tail lamp conduit 16 and the headlamp conduit 42 can be constructed from acrylonitrile-butadiene-styrene terpolymers (ABS) plastic or aluminum alloy. The casing of battery pack 38 and the threaded shaft length adjuster 22 are preferably made from ABS plastic. Because of the strength requirements, washer 17, quick release levers 14, 15 and 48 and cam levers 28 are preferably constructed from light metal or alloy, such as aluminum or aluminum alloy. Springs 26 and 31 are constructed from steel. Model U70sheadlamp from Germany, available in this country from the Union Frondenberg U.S.A. Co. in Olney, Illinois, has been used satisfactorily for headlamp 52. Likewise, a Model S70 lamp from the same source is also satisfactory for tail lamp 12.

It is thus believed that the operation and construction of the present invention will be apparent from the foregoing description. While the method and device shown and described have been characterized as being preferred, it will be obvious that various changes and modifications may be made therein without departing from the spirit and scope of the invention as defined in the following claims.

I claim:

1. A removably-mountable integral lighting system comprising:
   an elongate housing assembly comprising means for receiving a battery and adapted for removable securement to a structural member;
   a first lighting assembly comprising a conduit extending transversely from a forward end of said housing and said first lighting assembly being electrically connected to said battery for being illuminated; and
   a second lighting assembly mounted to a rear end of said housing and electrically connected to said battery for being illuminated.

2. A lighting system as set forth in claim 1 wherein said first lighting assembly comprises a headlamp.

3. A removably-mountable integral lighting system comprising:
   an elongate housing assembly comprising means for receiving a battery and adapted for removable securement to a structural member;
   a first lighting assembly comprising a headlamp, a conduit extending transversely from a forward end of said housing, and means for rotatably securing said headlamp to the end of said conduit to allow arcuate adjusting movement thereof with respect to said housing, and said first lighting assembly being electrically connected to said battery for being illuminated; and
   a second lighting assembly mounted to a rear end of said housing and electrically connected to said battery for being illuminated.

4. A removably-mountable integral lighting system comprising:
   an elongate housing assembly comprising means for receiving a battery and adapted for removable securement to a structural member;
   a first lighting assembly mounted to a forward end of said housing and electrically connected to said battery for being illuminated;
   a second lighting assembly mounted to a rear end of said housing and electrically connected to said battery for being illuminated; and
   means at said forward and rear ends of said housing for engaging said structural member of a vehicle to removably mount said system to said vehicle.

5. A lighting system as set forth in claim 4 wherein said forward end of said housing comprises a recess for receiving a protrusion on a structural member of a vehicle.

6. A removably-mountable integral lighting system comprising:
   an elongate housing assembly comprising means for receiving a battery and adapted for removable securement to a structural member, the overall length of said elongate housing assembly being adjustable in an axial direction to accomodate the mounting thereof onto structural members of different sizes:
   a first lighting assembly mounted to a forward end of said housing and electrically connected to said battery for being illuminated; and
   a second lighting assembly mounted to a rear end of said housing and electrically connected to said battery for being illuminated.

7. A lighting system as set forth in claim 6 wherein said elongate housing comprises at least two sections which are axially movable with respect to one another and spring biased against movement toward one another to allow compression of the spring when one end of the housing is moved toward the other end for providing a force of securement when said housing is positioned in a space between two structural members which space is smaller than the overall length of the housing in an uncompressed state.

8. A lighting system as set forth in claim 1 further comprising a manually actuatable switch means connected in a circuit between the battery and the lighting assemblies.

9. A lighting system as set forth in claim 1 wherein said second lighting assembly further comprises a tail lamp.

10. A removably-mountable integral lighting system comprising:

an elongate housing assembly comprising means for receiving a battery and adapted for removable securement to a structural member;
a first lighting assembly mounted to a forward end of said housing and electrically connected to said battery for being illuminated; and
a second lighting assembly comprising a tail lamp, a conduit extending transversely from a rear end of said housing and means for rotatably securing said tail lamp to the end of said conduit to allow arcuate adjusting movement thereof with respect to said housing, and said second lighting assembly being electrically connected to said battery for being illuminated.

11. A lighting system as set forth in claim 10 wherein said mounting conduit is also rotatably secured to the rear end of said housing assembly.

12. A lighting system as set forth in claim 1 wherein said housing assembly comprises means for engaging the structural frame members of a vehicle to secure said housing against relative movement with respect thereto.

13. A lighting system as set forth in claim 3 wherein said forward end of said housing assembly further includes an auxiliary bicycle tire pump peg extending transversely therefrom.

14. A lighting system as set forth in claim 1 wherein said elongate housing assembly further comprises:
means for receiving a plurality of rechargeable batteries and connecting said batteries in a series circuit relationship; and
means for connecting said batteries to a recharging means.

15. A removably-mountable integral light system for a bicycle and to be mounted on a tubular frame member of said bicycle in an area defined by a head tube, a down tube, a seat tube, and a top tube of said bicycle, said system comprising:
an elongate battery housing;
a forward lighting assembly comprising a headlamp mounted to one end of said housing; and
a rearward lighting assembly comprising a tail lamp mounted to the other end of said housing.

16. A removably-mountable integral light system for a bicycle, said system comprising:
an elongate battery housing;
a forward lighting assembly comprising a headlamp mounted to a forward end of said housing, said headlamp being rotatably secured to a conduit extending transversely from said forward end of said housing; and
a rearward lighting assembly comprising a tail lamp mounted to a rear end of said housing.

17. A lighting system as set forth in claim 15 wherein said elongate housing assembly comprises means for mounting said assembly between the structural members within said area of a bicycle.

18. A removably-mountable integral light system for a bicycle, said system comprising:
an elongate battery housing, a forward end of said elongate housing comprising means for receiving a tire pump peg of a bicycle;
a forward lighting assembly comprising a headlamp mounted to one end of said housing; and
a rearward lighting assembly comprising a tail lamp mounted to the other end of said housing.

19. A removably-mountable integral light system for a bicycle, said system comprising:
an elongate battery housing, the overall length of said elongate housing being adjustable in an axial direction;
a forward lighting assembly comprising a headlamp mounted to one end of said housing; and
a rearward lighting assembly comprising a tail lamp mounted to the other end of said housing.

20. A lighting system as set forth in claim 19 wherein said elongate housing comprises at least two sections which are axially movable with respect to one another and are spring biased against movement toward one another to allow compression of the spring when one end of the housing is moved towards the other for providing a force of securement when said housing is positioned in a space which is smaller than the overall length of the housing in an uncompressed state.

21. A lighting system as set forth in claim 15 further comprising a manually actuatable switch means connected in a circuit between the battery and the lighting assemblies.

22. A removably-mountable integral light system for a bicycle, said system comprising:
an elongate battery housing;
a forward lighting assembly comprising a headlamp mounted to a forward end of said housing;
a rearward lighting assembly comprising a tail lamp and a conduit extending transversely from a rear end of said housing; and
means for rotatably securing said tail lamp to the end of said conduit to allow arcuate adjusting movement thereof with respect to said housing.

23. A lighting system as set forth in claim 22 wherein said conduit is also rotatably secured to the rear end of said housing assembly for arcuate movement with respect thereto.

24. A removably-mountable integral light system for a bicycle having tubular members, said system comprising:
an elongate battery housing having a first and a second end, comprising means for engaging said tubular frame members of said bicycle to secure said housing against relative movement with respect thereto;
a forward lighting assembly comprising a headlamp mounted to said first end of said housing; and
a rearward lighting assembly comprising a tail lamp mounted to said second end of said housing.

25. A lighting system as set forth in claim 24 wherein the forward end of said housing further comprises an auxiliary bicycle tire pump peg extending transversely therefrom.

26. A lighting system as set forth in claim 15 wherein said elongate housing assembly further comprises:
means for receiving a plurality of rechargeable batteries and connecting said batteries in a series circuit relationship; and
means for connecting said batteries to a recharging means.

27. A removably-mountable integral lighting system comprising:
an elongate housing assembly comprising means for receiving a battery and adapted for removable securement to a structural member;
a first lighting assembly, comprising a headlamp, and a conduit extending transversely from a forward end of said housing and said first lighting assembly being electrically connected to said battery for illuminating said headlamp; and a second lighting assembly comprising a tail lamp mounted to a rear end of said housing and electrically connected to said battery for illuminating said tail lamp.

28. A removably-mountable integral lighting system comprising:
   an elongate housing assembly comprising means for receiving a battery and adapted for removable securement to a structural member;
   a first lighting assembly, comprising a headlamp, and a conduit extending transversely from a forward end of said housing and said first lighting assembly being electrically connected to said battery for illuminating said headlamp;
   means for rotatably securing said headlamp to the end of said conduit to allow arcuate adjusting movement thereof with respect to said housing; and
   a second lighting assembly comprising a tail lamp mounted to a rear end of said housing and electrically connected to said battery for illuminating said tail lamp.

29. A removably-mountable integral lighting system comprising:
   an elongate housing assembly comprising means for receiving a battery and adapted for removable securement to a structural member; and means located at said forward and rear ends thereof for engaging the structural members of a bicycle to removably mount said system to the bicycle;
   a first lighting assembly, comprising a headlamp, mounted to a forward end of said housing and electrically connected to said battery for illuminating said headlamp; and
   a second lighting assembly comprising a tail lamp mounted to a rear end of said housing and electrically connected to said battery for illuminating said tail lamp.

30. A lighting system as set forth in claim 29 wherein said forward end of said housing comprises a recess for receiving a tire pump peg of a bicycle.

31. A removably-mountable integral lighting system comprising:
   an elongate housing assembly comprising means for receiving a battery and adapted for removable securement to a structural member, the overall length of said elongate housing assembly being adjustable in an axial direction to accommodate mounting of said assembly on different sizes of bicycles;
   a first lighting assembly, comprising a headlamp, mounted to a forward end of said housing and electrically connected to said battery for illuminating said headlamp; and
   a second lighting assembly comprising a tail lamp mounted to a rear end of said housing and electrically connected to said battery for illuminating said tail lamp.

32. A removably-mountable integral lighting system comprising:
   an elongate housing assembly comprising means for receiving a battery and adapted for removable securement to a structural member, and at least two sections which are axially movable with respect to one another and are spring biased against movement toward one another to allow compression of the spring when one end of the housing is moved toward the other for providing a force of securement when said housing is positioned in a space between two bicycle structural members which space is smaller than the overall length of the housing in an uncompressed state;
   a first lighting assembly, comprising a headlamp, mounted to a forward end of said housing and electrically connected to said battery for illuminating said headlamp; and
   a second lighting assembly comprising a tail lamp mounted to a rear end of said housing and electrically connected to said battery for illuminating said tail lamp.

33. A lighting system as set forth in claim 27 further comprising a manually actuatable switch means connected in a circuit between the battery and the lighting assemblies.

34. A removably-mountable integral lighting system comprising:
   an elongate housing assembly comprising means for receiving a battery and adapted for removable securement to a structural member;
   a first lighting assembly, comprising a headlamp, mounted to a forward end of said housing and electrically connected to said battery for illuminating said headlamp;
   a second lighting assembly comprising a tail lamp and a conduit extending transversely from a rear end of said housing and said second lighting assembly being electrically connected to said battery for illuminating said tail lamp; and
   means for rotatably securing said tail lamp to the end of said conduit to allow arcuate adjusting movement thereof with respect to said housing.

35. A lighting system as set forth in claim 34 wherein said conduit is also rotatably secured to said rear end of said housing assembly for arcuate movement with respect thereto.

36. A removably-mountable integral lighting system comprising:
   an elongate housing assembly comprising means for receiving a battery and adapted for removable securement to a structural member, and means for engaging tubular frame members of a bicycle to secure said housing against relative movement with respect thereto;
   a first lighting assembly, comprising a headlamp, mounted to a forward end of said housing and electrically connected to said battery for illuminating said headlamp; and
   a second lighting assembly comprising a tail lamp mounted to a rear end of said housing and electrically connected to said battery for illuminating said tail lamp.

37. A lighting system as set forth in claim 36 wherein said housing further comprises an auxiliary bicycle tire pump peg extending transversely therefrom.

38. A lighting system as set forth in claim 27 wherein said elongate housing assembly further comprises:
   means for receiving a plurality of rechargeable batteries and connecting said batteries in a series circuit relationship; and
   means for connecting said batteries to a recharging means.

39. A removably-mountable integral lighting system comprising:
   an elongate housing assembly comprising means for receiving a battery and adapted for removable securement to a structural member;

a first lighting assembly, comprising a headlamp, mounted to a forward end of said housing and electrically connected to said battery for illuminating said headlamp;

a second lighting assembly comprising a tail lamp mounted to a rear end of said housing and electrically connected to said battery for illuminating said tail lamp; and both said headlamp and tail lamp being configured to extend to one side of said housing assembly.

40. A removably-mountable integral lighting system comprising:

an elongate housing assembly comprising means for receiving a battery and adapted for removable securement to a structural member;

a first lighting assembly, comprising a headlamp, mounted to a forward end of said housing and electrically connected to said battery for illuminating said headlamp;

a second lighting assembly comprising a tail lamp mounted to a rear end of said housing and electrically connected to said battery for illuminating said tail lamp; and said headlamp being configured to extend to one side of said housing assembly, and said tail lamp being configured to extend to the opposite side of said housing assembly.

41. A removably-mountable integral lighting system comprising:

an elongate housing assembly comprising means for receiving a battery and adapted for removable securement to a structural member;

a lighting assembly comprising a conduit extending transversely from said housing and said lighting assembly being electrically connected to said battery for being illuminated.

42. A lighting system as set forth in claim 41 wherein said lighting assembly further comprises a headlamp.

43. A lighting system as set forth in claim 41 wherein said conduit extends transversely from a forward end of said housing.

44. A lighting system as set forth in claim 41 wherein said lighting system further comprises a tail lamp.

45. A lighting system as set forth in claim 41 wherein said conduit extends transversely from a rear end of said housing.

46. A removably-mountable integral lighting system comprising:

an elongate housing assembly comprising means for receiving a battery and adapted for removable securement to a structural member;

a lighting assembly comprising a headlamp and a conduit extending transversely from a forward end of said housing and said lighting assembly being electrically connected to said battery for being illuminated.

47. A removably-mountable integral lighting system comprising:

an elongate housing assembly comprising means for receiving a battery and adapted for removable securement to a structural member;

a lighting assembly comprising a tail lamp and a conduit extending transversely from a rear end of said housing and said lighting assembly being electrically connected to said battery for being illuminated.

48. A removably-mountable integral lighting system comprising:

an elongate housing assembly comprising means for receiving a battery and adapted for removable securement to a structural member;

a first lighting assembly comprising a first conduit extending transversely from a forward end of said housing and being electrically connected to said battery for being illuminated; and a second lighting assembly comprising a second conduit extending transversely from a rear end of said housing and being electrically connected to said battery for being illuminated.

49. A removably-mountable integral light system for a bicycle, said system comprising:

an elongate battery housing comprising means for engaging tubular frame members of a bicycle to secure said housing against relative movement with respect thereto; and a forward lighting assembly comprising a headlamp mounted to one end of said housing.

50. A removably-mountable integral light system for a bicycle, said system comprising:

an elongate battery housing comprising means for engaging tubular frame members of a bicycle to secure said housing against relative movement with respect thereto; and a rearward lighting assembly comprising a tail lamp mounted to the other end of said housing.

* * * * *

UNITED STATES PATENT AND TRADEMARK OFFICE
CERTIFICATE OF CORRECTION

PATENT NO. : 4,970,630

DATED : Nov. 13, 1990

INVENTOR(S) : Mudrovich et al

It is certified that error appears in the above-identified patent and that said Letters Patent is hereby corrected as shown below:

On the title page:

Item [19] should read --Mudrovich et al--.

Item [75] Inventors: --Ronald R. Hector-- should be added as a co-inventor.

Signed and Sealed this

Third Day of March, 1992

Attest:

HARRY F. MANBECK, JR.

*Attesting Officer*     *Commissioner of Patents and Trademarks*